US012661842B2

(12) United States Patent
Urabl

(10) Patent No.: US 12,661,842 B2
(45) Date of Patent: Jun. 23, 2026

(54) METHOD, SYSTEM, AND BLOW MOLDING MACHINE FOR BLOW MOLDING A CONTAINER

(71) Applicant: ALPLA Werke Alwin Lehner GmbH & Co. KG, Hard (AT)

(72) Inventor: Stephan Urabl, Höchst (AT)

(73) Assignee: ALPLA Werke Alwin Lehner GmbH & Co. KG, Hard (AT)

( * ) Notice: Subject to any disclaimer, the term of this patent is extended or adjusted under 35 U.S.C. 154(b) by 133 days.

(21) Appl. No.: 18/246,385

(22) PCT Filed: Sep. 20, 2021

(86) PCT No.: PCT/EP2021/075772
§ 371 (c)(1),
(2) Date: Mar. 23, 2023

(87) PCT Pub. No.: WO2022/063717
PCT Pub. Date: Mar. 31, 2022

(65) Prior Publication Data
US 2023/0390989 A1 Dec. 7, 2023

(30) Foreign Application Priority Data
Sep. 23, 2020 (CH) ...................................... 1203/20

(51) Int. Cl.
*B29C 49/24* (2006.01)
*B29C 49/00* (2006.01)
(Continued)

(52) U.S. Cl.
CPC ............ *B29C 49/24* (2013.01); *B29C 49/071* (2022.05); *B29C 49/42073* (2022.05);
(Continued)

(58) Field of Classification Search
CPC .............. B29C 49/14; B29C 49/42073; B29C 49/42087; B29C 2949/0745;
(Continued)

(56) References Cited

U.S. PATENT DOCUMENTS 8,118,587 B2 * 2/2012 Blochmann ....... B29C 49/42073
425/522
2014/0054829 A1 * 2/2014 Poo .......................... B29C 49/12
264/533
(Continued)

FOREIGN PATENT DOCUMENTS

EP 2 803 467 A1 11/2014
EP 3 375 593 B1 6/2019
(Continued)

OTHER PUBLICATIONS

International Search Report Corresponding to PCT/EP2021/075772 mailed Dec. 6, 2021.
(Continued)

*Primary Examiner* — Michael A Tolin
*Assistant Examiner* — Hana C Page
(74) *Attorney, Agent, or Firm* — Secant IP, P.L.L.C.

(57) ABSTRACT

A method for blow molding a container having a fiber-based shell (20) is disclosed. The method comprises the steps of
providing a fiber-based shell (20)
introducing a preform (30) into the fiber-based shell (20) in order to produce a semi-finished product (60)
gripping the semi-finished product (60) by means of a gripper (40)
transferring the semi-finished product (60) into a blow molding tool (50) and
blowing the container. The gripper (40) presses an inner wall (21) of the fiber-based shell (20) onto an outer surface (31) of the preform (30).

11 Claims, 3 Drawing Sheets

Figure 1:
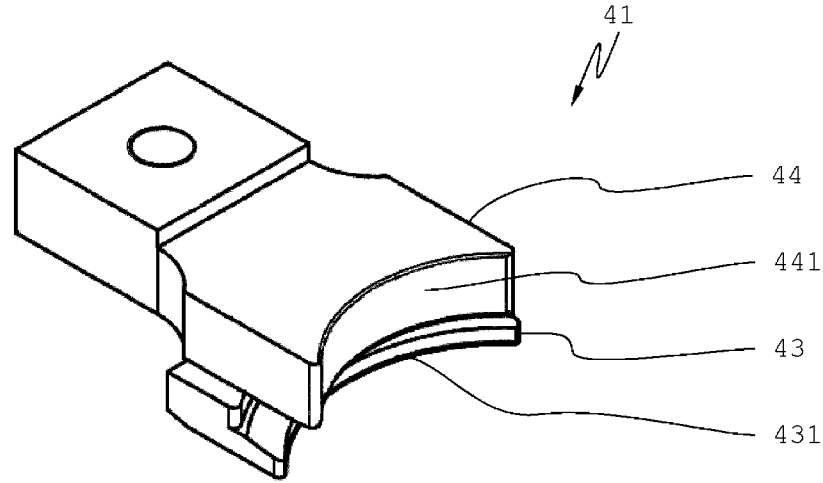

(51) Int. Cl.
    *B29C 49/42*         (2006.01)
    *B29L 31/00*         (2006.01)

(52) U.S. Cl.
    CPC ................. *B29C 2049/2404* (2013.01); *B29C 2049/2443* (2013.01); *B29C 2049/2464* (2013.01); *B29L 2031/7158* (2013.01)

(58) Field of Classification Search
    CPC ........ B29C 2049/2443; B29C 49/4205; B29C 49/42422; B29C 2049/2404
    See application file for complete search history.

(56)                 References Cited

U.S. PATENT DOCUMENTS

2014/0319301 A1 * 10/2014 Gruson ................ B65G 47/908
                                               248/312.1

2015/0308050 A1 * 10/2015 Corbett ................... B29C 49/24
                                             162/218
2020/0283184 A1    9/2020 Warner
2022/0143895 A1 * 5/2022 Shimada ................ B29C 49/12

FOREIGN PATENT DOCUMENTS

| EP | 3747623 A1 * | 12/2020 | .......... B29C 45/261 |
|----|----|----|----|
| WO | 2012/139590 A1 | 10/2012 | |
| WO | 2018/167192 A1 | 9/2018 | |
| WO | 2020/070255 A1 | 4/2020 | |

OTHER PUBLICATIONS

Written Opinion Corresponding to PCT/EP2021/075772 mailed Dec. 6, 2021.

\* cited by examiner

METHOD, SYSTEM, AND BLOW MOLDING MACHINE FOR BLOW MOLDING A CONTAINER

The present invention relates to a method for blow molding a container, to a system composed of a gripper and a head plate of a blow molding tool for carrying out the method, and to a blow molding machine comprising a system of this type according to the preamble of the independent claims.

Different containers for holding liquid are known from the prior art. For example, glass bottles or plastic bottles for holding beverages have become established. Containers which are made of fiber-based material have likewise already been proposed.

A fiber-based container was proposed in WO 2012/139590 A1. To produce this container, what is known as pulp is introduced into a mold and within this mold pressed with a flexible balloon against a corresponding wall and compressed accordingly.

The pulp is a mixture of fibers and water, in particular natural fibers such as hemp fibers, cellulose fibers or flax fibers or a mixture thereof. The pulp may have additives, as known, for example, from PCT/EP2019/076839, which, for example, improve curing of the compressed pulp or have an influence on the later appearance or generally change the properties of the pulp or of the later container.

In the case of these containers, there is a risk of them softening due to liquid stored in the container and, for example, becoming leaky or of substances diffusing out of the container into the liquid.

It has been proposed to provide such fiber-based containers with an inner layer made of plastic, in particular to arrange within the fiber-based container a plastic bottle which can assume corresponding barrier functions. The fiber-based container thus only provides a shell for a thin-walled plastic container. Such a combination has become known from WO 2018/167192 A1.

Thus, typically a fiber-based shell is provided, into which a plastic layer or a plastic lining is introduced. This typically occurs in the following manner: in a first step, the fiber-based shell is provided, and in a second step, a preform is introduced into this shell. Subsequently, this preform is inflated within the fiber-based shell until the preform touches an inner contour of the fiber-based shell or is in contact with the inner contour of the fiber-based shell. This inflation process typically takes place in a blow mold whose cavity corresponds to the outer contour of the fiber-based shell. Since, in contrast to conventional blowing methods, two separate elements have to be handled, such a process is much more complicated, because the preform has to be positioned and held relative to the fiber-based shell and the latter in turn has to be positioned and held within the blow mold.

An exemplary process is described, for example, in EP 3 375 593 A1. For the production of a container, EP 3 375 593 A1 describes a preform which has, in its neck region, protrusions, which can be brought into engagement with a corresponding fiber-based shell, with the aim that the shell and the preform remain connected to one another. However, it has been found that this type of connection is failure-prone, since the inner contour or the inner surface of the shell is subject to deviations of different size, depending on the specific properties of the pulp from which the shell is formed. This is disadvantageous particularly in the neck region, since for a clean pressing between the preform or its protrusions and the fiber-based shell certain tolerance limits must be adhered to, but this is not always possible due to the different process parameters and due to the pulp characteristics, which vary under certain circumstances.

It is an object of the invention to eliminate one or more disadvantages of the prior art. In particular, a method and/or a system composed of a gripper and a head plate of a blow mold for blow molding a container are to be provided, which method and/or system simplifies production and increases process reliability.

This object is achieved by the methods and devices described in the independent claims. Further advantageous embodiments arise from the dependent claims.

A method according to the invention for blow molding a container having a fiber-based shell comprises the steps of:
  providing a fiber-based shell
  introducing a preform into the fiber-based shell in order to produce a semi-finished product
  gripping the semi-finished product by means of a gripper
  transferring the semi-finished product into a blow molding tool; and
  blowing the container.

The gripper presses an inner wall of the fiber-based shell onto an outer surface of the preform. The outer surface of the preform can be located on the neck of the preform, but it is also possible for the outer surface to be located on a region of a protrusion on the neck of the preform.

The term "semi-finished product" is understood herein to mean the combination of a fiber-based shell and a preform arranged relative to this fiber-based shell. This relative positioning is already the end position that a preform neck has with respect to the fiber-based shell.

With respect to axes and/or directions, a longitudinal axis or an axial direction corresponds to that direction which extends from a base of the preform or of the container to the opening of the preform or of the container. Proceeding from this axis, the radial direction is also defined. Thus, the axial direction also lies substantially in a plane of blow mold parting surfaces.

By the pressing of an inner wall of the fiber-based shell onto an outer surface of the preform by means of the gripper, a force is thus induced between these two surfaces and accordingly the frictional force between these two surfaces is increased. In other words, by the positioning of a gripper on an outer surface of the fiber-based shell, the fiber-based shell can be held securely together with the preform. The semi-finished product composed of the preform and the fiber-based shell can be easily and securely manipulated, in particular easily and securely transferred into a blow mold.

It is preferably provided that, from the first gripping of the semi-finished product by means of the gripper until the introduction into the blow mold, a uniform pressure is applied to the fiber-based shell, so that the fiber-based shell is pressed substantially constantly onto the preform. Process reliability can thereby be further increased.

In addition, it can be provided that the gripper surrounds the semi-finished product continuously during the blowing process.

By surrounding the semi-finished product continuously during the blowing process, the gripper can additionally take on a positioning function of a part of the blow mold. Thus, the gripper can be used as a means for holding and positioning the semi-finished product within the blow mold and/or during the blowing.

Additionally or alternatively, it can be provided that the gripper is in contact with the blow molding tool, in particular in contact with a head plate of the blow molding tool, during the blowing process.

Hence, the gripper can be supported on the blow molding tool or on a head plate of the blow molding tool and thus can transmit axial forces acting on the gripper or the semi-finished product to the blow mold.

Preforms typically have what are known as support rings in order to facilitate manipulation of the preforms. Such a support ring is also described for example with respect to the preform of EP 3 375 593 A1.

The support ring divides a preform and correspondingly likewise a container into two regions. In particular, the support ring separates a closure region of the container from the rest of the container. As can be seen, for example, from the aforementioned EP application, the fiber-based shell is arranged below the support ring. The method as described herein therefore typically has a gripper which grips the semi-finished product below the support ring and presses the fiber-based shell onto an outer surface of the preform accordingly below this support ring.

However, it can also be provided that the gripper grips the semi-finished product both below the support ring and above the support ring of the preform.

For this purpose, the gripper can be substantially C-shaped in cross section in the region of the support ring.

By the gripping of the semi-finished product both below the support ring and above the support ring, axial displacement of the semi-finished product can be reliably prevented or the semi-finished product can be set, with respect to its axial positioning, to a certain position.

For this purpose, it can be provided that the gripper has a first gripping jaw and a second gripping jaw, which are spaced apart from one another in the axial direction.

It can be provided that, as the preform is introduced into the fiber-based shell, an upper end of the fiber-based shell is brought into contact with the support ring.

This allows the preform to be positioned relative to the fiber-based shell. It is particularly advantageous if the fiber-based shell has been fabricated to an appropriate length before it is provided.

The gripper preferably grips the semi-finished product from at least two sides and clamps the semi-finished product likewise from at least two sides.

By the clamping from two sides, the semi-finished product can be positioned centrally in the gripper. It can be provided that, for the gripping of the semi-finished product from at least two sides, the gripper has two members, which are arranged opposite one another with respect to the longitudinal axis.

It is typically provided that, after the semi-finished product has been transferred into the blow molding tool, the blow molding tool is closed. Blow molding tools typically have two blow mold halves, which can be connected to one another along a parting plane. After the container has been blown, the blow molding tool is opened and the now fully blown container is removed with the gripper from the blow molding tool and transferred, for example, to a conveying apparatus for further processing.

A further aspect of the invention relates to a system composed of a gripper and a head plate of a blow molding tool for carrying out the method described herein. The gripper has a first gripping jaw with a height and the head plate has a recess with a depth corresponding to the height of the gripping jaw. Alternatively, the head plate can have a projection with a height corresponding to the height of the gripping jaw.

As a result of the provision of a recess having the same height as the gripping jaw, the gripping jaw can be introduced into the recess within the head plate, wherein an upper edge of the gripping jaw comes to lie substantially in the same plane as an upper edge of the head plate. In other words, a corresponding recess in the head plate in connection with the gripping jaw makes it possible to provide a substantially coherent surface lying in one plane, on which surface, for example, a support ring of the preform can be uniformly supported. If corresponding projections are provided on the head plate, they are arranged in such a way that they fill a free space towards the gripping jaw in such a way that likewise a substantially coherent surface lying in one plane is provided.

The recess can have an outer contour which substantially corresponds to an outer contour of the gripping jaw.

Thus, the gripping jaw can be inserted into the recess in a precise fit, and lateral displacement of the gripping jaw is prevented. The gripping jaw can be positioned reliably and precisely with respect to the longitudinal axis by corresponding radial stops.

The gripper can have a second gripping jaw, which is spaced apart from the first gripping jaw in such a way that a support ring can be introduced between the first gripping jaw and the second gripping jaw. Thus, the first gripping jaw is axially spaced apart from the second gripping jaw. Thus, the first gripping jaw and the second gripping jaw together form an approximately C-shaped cross section.

Thus, the gripper can grip the semi-finished product both below the support ring and above the support ring of the preform.

By the gripping of the semi-finished product both below the support ring and above the support ring, axial displacement of the semi-finished product can be reliably prevented or the semi-finished product can be set, with respect to its axial positioning, to a certain position.

It can be provided that the gripper has a first member and a second member, on each of which a first gripping jaw is arranged.

In an end position, i.e. during the gripping process, when the semi-finished product is clamped in the gripper, these two members are arranged opposite one another.

By means of this arrangement, the gripper can clamp the semi-finished product from at least two sides.

By the clamping from two sides, the semi-finished product can be positioned centrally in the gripper.

It can be provided that a second gripping jaw is arranged at least on one, preferably on each, member.

As already explained, this permits the exact axial positioning of the semi-finished product within the gripper and thus likewise relative to the blow mold during the blowing process.

It can be provided that the first gripping jaw and/or each first gripping jaw has a gripping surface which extends along a circular ring over an angle of at least 30°. First, this ensures that the semi-finished product is encompassed over a minimum range, and second, it is ensured that a gripping force is distributed over a certain minimum surface area and thus a pressing of the fiber-based shell onto the preform does not exceed a limit value.

Likewise, the second gripping jaw and/or each second gripping jaw can have a gripping surface which extends along a circular ring over an angle of at least 30°. First, this ensures that the semi-finished product is encompassed over a minimum range, and second, it is ensured that a gripping force is distributed over a certain minimum surface area and thus a pressing of the preform does not exceed a limit value.

The first gripping surface and the second gripping surface can be offset relative to one another in a radial direction, in particular by an offset which corresponds to a wall thickness of the fiber-based shell. In this case, the second gripping surface, i.e. the gripping surface which comes to lie above the support ring, is arranged closer to the longitudinal axis than the first gripping surface, which comes to lie below the support ring.

In this configuration, the pressure on the preform above the support ring and on the combination of the preform and the fiber-based shell below the support ring is distributed uniformly.

A further aspect of the present invention relates to a blow molding machine comprising a system as described herein.

This enables the provision of a complete production unit with all of the mutually matched elements.

Figure 3:
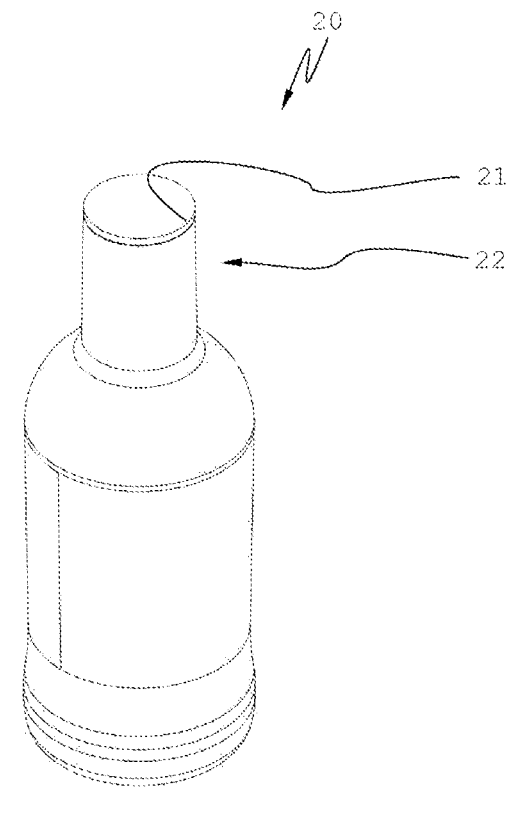
Figure 4:
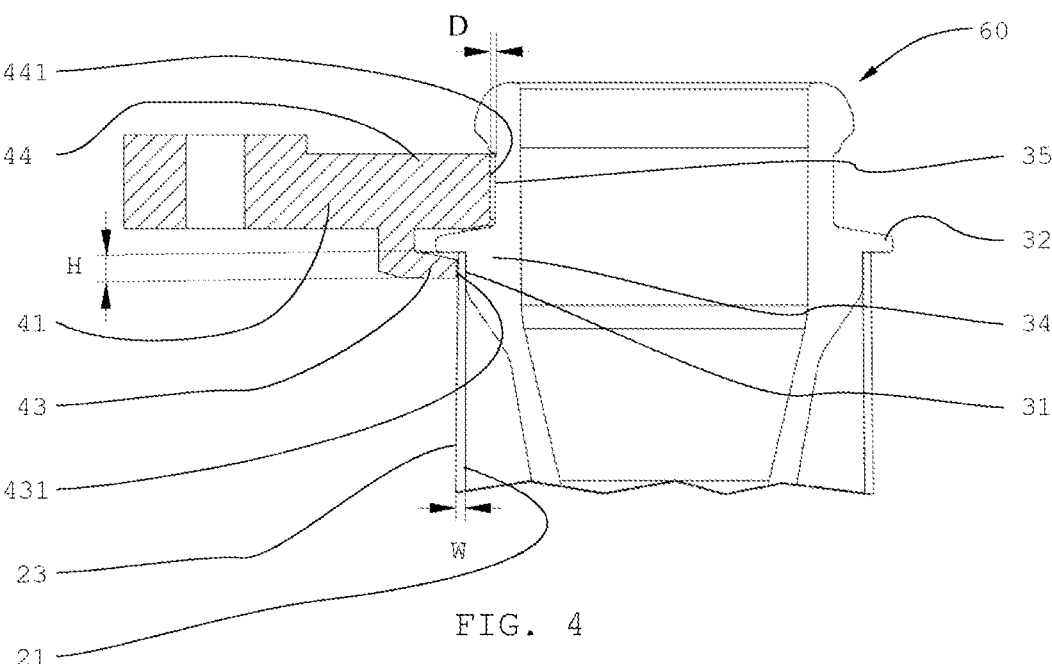
Figure 5:
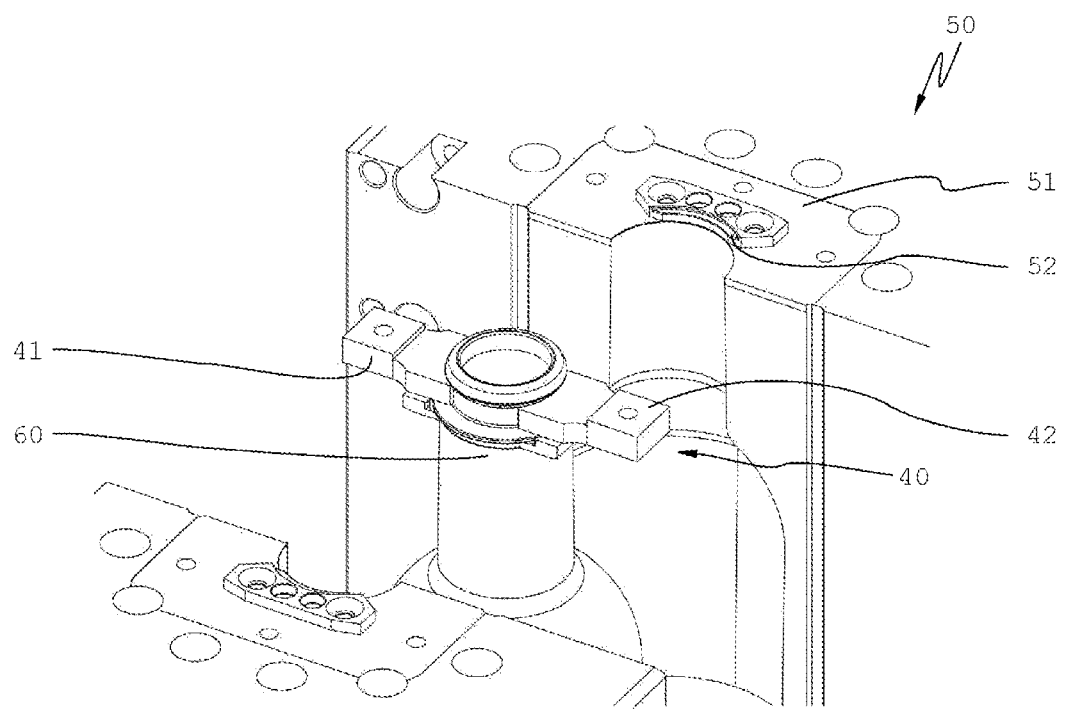
Figure 6:
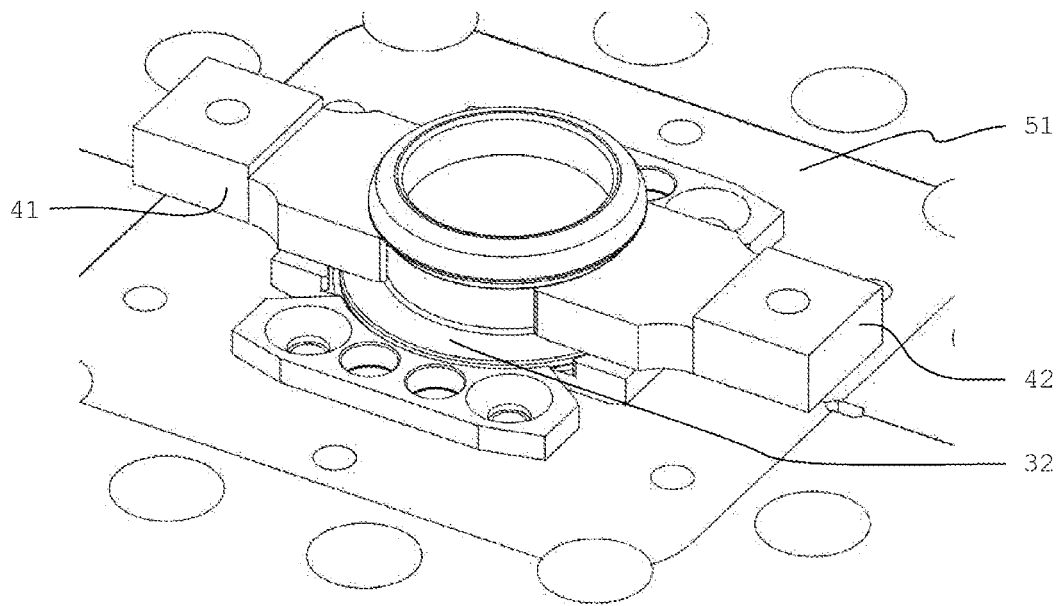

The invention is explained below with reference to schematic figures by means of exemplary embodiments. These show:

FIG. 1: a perspective view of a member of a gripper;

FIG. 2: a preform;

FIG. 3: a perspective view of a fiber-based shell;

FIG. 4: a cross section through a semi-finished product during the gripping;

FIG. 5: a perspective view of a blow mold before the closing;

FIG. 6: a detailed view of the blow mold from FIG. 5, after the closing.

FIG. 1 shows a perspective view of a member 41 of a gripper 40 (see FIG. 5). The member 41 has a first gripping jaw 43 and a second gripping jaw 44. A gripping surface 431 is located on the first gripping jaw 43, and a gripping surface 441 is located on the second gripping jaw 44. The gripping surfaces 441 and 431 each extend along a circular ring over an angle of 30°. The first gripping jaw 43 is axially spaced apart from the second gripping jaw 44. In cross section, the first gripping jaw 43 forms a substantially C-shaped cross section with the second gripping jaw 44. This C-shaped cross section is designed to receive a corresponding support ring 32 (see FIG. 2). In relation to the second gripping jaw 44, the first gripping jaw 43 is offset radially outwards (see also FIG. 4).

In particular on the gripping surface 431 of the first gripping jaw 43, contours can be formed, which improve the friction between this gripping surface 431 and a fiber-based shell 20 to be gripped.

Figure 2:
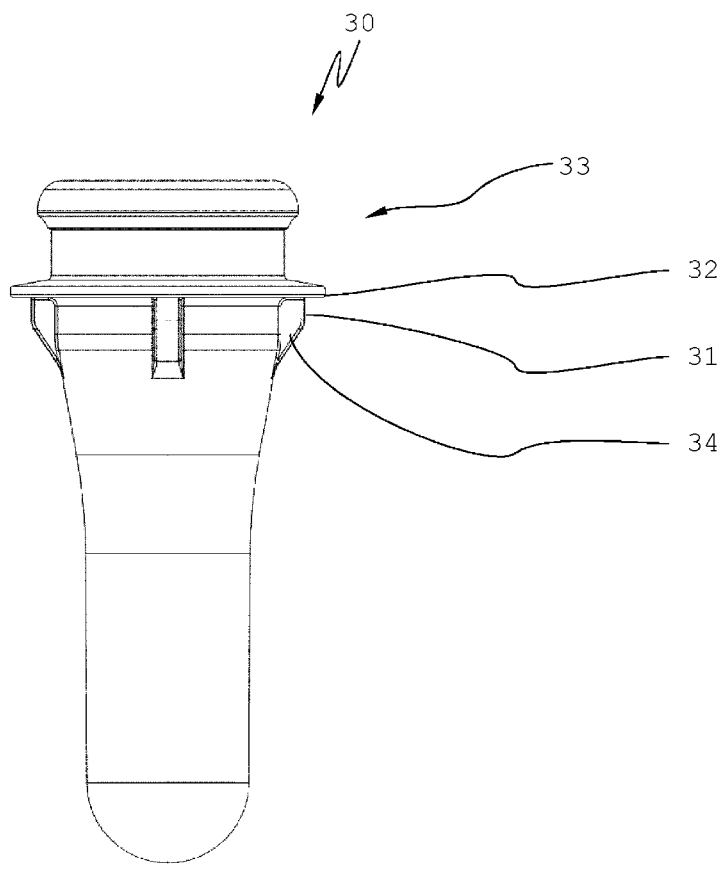

FIG. 2 shows a preform 30. The preform 30 has an elongate body with a preform base. A support ring 32, which divides the preform 30, is arranged on the preform 30. In the present illustration, a closure region 33 is arranged above the support ring 32. In the present illustration, below the support ring 32 the preform body has four projections 34, on each of which an outer surface 31 is formed. For the sake of improved clarity, only one of the projections 34 and one of the outer surfaces 31 are provided with reference signs.

FIG. 3 shows a perspective view of a fiber-based shell 20. The fiber-based shell 20 has an upper end 22 which is substantially in the shape of a hollow cylinder. An inner wall 21 is formed at this upper end.

FIG. 4 shows a cross section through a semi-finished product 60 during the gripping. In the illustration according to FIG. 4, a preform 30 (see FIG. 2) is thus introduced into a fiber-based shell 20 (see FIG. 3). The fiber-based shell 20 has a wall with a wall thickness W, and this wall has an inner wall 21 and an outer wall 23. The inner wall 21 of the fiber-based shell 20 is in contact with an outer surface 31 of the preform 30. The outer surface 31 is formed on a projection 34. There is already a clamping effect between the preform 30 and the fiber-based shell 20. FIG. 4 also shows a first member 41 of a gripper 40 (see FIG. 5). The member

41 has a first gripping jaw 43 and a second gripping jaw 44. The gripping surface 431 of the first gripping jaw 43 is just in contact with the outer wall 23 of the fiber-based shell 20. FIG. 4 shows that at this point in time the second gripping jaw 44 is spaced apart from an outer surface 35 of the closure region 33 with the distance D. To fix the fiber-based shell 20 on the preform 30, the member 41 is moved towards the preform 30 until the distance D disappears. In the process, the wall thickness W of the fiber-based shell 20 is compressed by the distance D and accordingly pressed onto the projection 34. The distance D is smaller than the wall thickness W and in the present case is approximately half of the wall thickness W. Here, the gripping surface 431 of the first gripping jaw 43 is radially spaced apart from the gripping surface 441 of the second gripping jaw 44. The distance is the difference between the wall thickness W and the distance D plus the height of the projection 34, i.e. the distance between the outer surface 31 and the outer surface 35 of the closure region 33. Of course, a second member 42, which for the sake of simplicity is not shown, is arranged opposite the member 41. In the present case, the second member 42 is designed like the first member 41.

As can also be seen in FIG. 4, the first gripping jaw 43 is offset radially outwards with respect to the second gripping jaw 44. In the present case, the offset equals a height of the projection 34 relative to the outer surface 35 of the closure region plus approximately half of the wall thickness W.

The height H of the first gripping jaw 43 is also shown.

FIG. 5 shows a perspective view of a blow mold 50 before the closing. A semi-finished product 60 is introduced into an opened blow mold 50 by means of a gripper 40, which has a first member 41 and a second member 42. The two members 41 and 42 of the gripper 40 are arranged on two gripper arms, not shown here, which can be pivoted together into the blow mold 50 and out.

The blow mold 50 has two blow mold halves, which are not described in greater detail, and a half of a head plate 51 is arranged on each blow mold half. An elevation is formed on the head plate 51, on which elevation a projection 52 is formed. The projection 52 has a height that corresponds to the height H of the first gripping jaw 43 (see FIG. 4).

FIG. 6 shows a detailed view of the blow mold 50 after the closing. The support ring 32 now lies on the projections 52 (see FIG. 5) of the head plate 51. The members 41 and 42 lie essentially on the head plate 51 between the projections 52. Since the members 41 and 42 rest on the head plate, they are precisely positioned in the axial direction. In this illustration, the support ring lies only on the projections 52. Alternatively, the projections 52 can form, together with a surface of each of the first gripping jaws 43 (see FIG. 4), a common surface for supporting the support ring 32. It is also possible that the members 41 and 42 are still slightly spaced apart from the head plate 51 in the position shown in FIG. 6 in order to prevent excessive friction as the blow mold 50 is brought together. In this case, during the blowing process the members 41 and 42 can be pressed onto the head plate 51, which correspondingly forms a counter bearing.

The invention claimed is:

1. A system composed of a gripper (40) for transferring a semi-finished product into a blow molding tool and a head plate (51) of the blow molding tool (50), wherein the gripper (40) has a first gripping jaw (43) with a height (H) and the head plate (51) has a recess with a depth that equals the height (H) of the first gripping jaw (43) or has a projection (52) with a height that equals the height (H) of the first gripping jaw (43) to form a planar support surface.

2. The system according to claim 1, wherein the recess has an outer contour which substantially corresponds to an outer contour of the first gripping jaw (43).

3. The system according to claim 1, wherein the gripper (40) has a second gripping jaw (44), which is spaced apart from the first gripping jaw (43) in such a way that a support ring of the semi-finished product is introducible between the first gripping jaw (43) and the second gripping jaw (44).

4. The system according to claim 1, wherein the gripper (40) has a first member (41) and a second member (42), the first gripping jaw is arranged on the first member and another first gripping jaw (43) is arranged on the second member.

5. The system according to claim 4, wherein one second gripping jaw (44) is arranged at least on one of the first and the second members (41, 42).

6. The system according to claim 1, wherein the first gripping jaw (43) has a gripping surface (431) which extends along a circular ring over an angle of at least 30°.

7. The system according to claim 3, wherein the second gripping jaw (44) has a gripping surface (441) which extends along a circular ring over an angle of at least 30°.

8. The system according to claim 3, wherein the first gripping jaw has a first gripping surface and the second gripping jaw has a second gripping surface, the first gripping surface (431) and the second gripping surface (441) are offset relative to one another in a radial direction.

9. The system according to claim 5, wherein the second gripping jaw (44) and another second gripping jaw are arranged on the first and the second members (41, 42), respectively.

10. The system according to claim 8, wherein the first gripping surface (431) and the second gripping surface (441) are offset relative to one another in a radial direction by a wall thickness (W) of a fiber-based shell of a fiber-based container to be gripped.

11. A blow molding machine comprising a system according to claim 1.

\* \* \* \* \*